US007240786B2

(12) United States Patent
Boyadjian

(10) Patent No.: US 7,240,786 B2
(45) Date of Patent: Jul. 10, 2007

(54) FEED APPARATUS AND BINDING DEVICE

(76) Inventor: Hratch Boyadjian, Obstgartenstrasse 8, Erlenbach (CH) CH-8703

( * ) Notice: Subject to any disclaimer, the term of this patent is extended or adjusted under 35 U.S.C. 154(b) by 474 days.

(21) Appl. No.: 10/959,181

(22) Filed: Oct. 7, 2004

(65) Prior Publication Data

US 2005/0244253 A1 Nov. 3, 2005

(30) Foreign Application Priority Data

May 3, 2004 (CH) ....................................... 780/04
Oct. 7, 2004 (CH) ..................................... 1649/04

(51) Int. Cl.
*B65G 45/18* (2006.01)

(52) U.S. Cl. ....................................... 198/496; 15/256.5

(58) Field of Classification Search ................ 198/493, 198/496, 498; 15/256.5
See application file for complete search history.

(56) References Cited

U.S. PATENT DOCUMENTS 669,821 A * 3/1901 Derdyn ........................ 198/496
2,083,864 A * 6/1937 Puckett ........................ 198/496
2,512,073 A * 6/1950 Oscar .......................... 198/496
3,212,631 A * 10/1965 Thompson .................. 198/496
3,761,983 A 10/1973 Staats
5,671,838 A * 9/1997 Bowman .................... 198/496

FOREIGN PATENT DOCUMENTS

DE 34 06 146 A 8/1985

* cited by examiner

*Primary Examiner*—James R Bidwell
(74) *Attorney, Agent, or Firm*—Oliff & Berridge, PLC

(57) ABSTRACT

A feed apparatus for isolating and feeding spirals (3) or the like to a binding apparatus has an isolating roll (12) comprising depressions (19), which are distributed over the circumferential surface (11) thereof and are parallel to the axis, for receiving in each case a spiral (3), which circumferential surface (11) is moved under a scraper (20) which comprises a chain (25) which is moved in the opposite direction over two rollers (21, 22) arranged vertically one on top of the other and which carries outward-projecting scraping fingers (27) which are in the form of bundles of resilient bristles. From the circumferential surface (11), the spirals (3) pass via a baffle plate (40) onto a conveyor (30) having drivers (37) which transport them to a slot (43), where they are delivered to the binding apparatus. If no spiral (3) was picked up by the depression (19) of the isolating roll (12) and further transported to the conveyor (30), the baffle plate (40) is advanced in the conveying direction for avoiding a failure.

30 Claims, 4 Drawing Sheets

FEED APPARATUS AND BINDING DEVICE

FIELD OF THE INVENTION

The invention relates to a feed apparatus for feeding binding parts, such as spirals or spines of plastic, to an apparatus for further processing, such as a binding apparatus or printing unit, and a binding device as used for mounting such binding parts on bundles of individual sheets for binding thereof into brochures, notebooks, calendars and the like.

PRIOR ART

Various binding devices are known (for example the spiral binding device R6-PVC from SWIGRAPH AG), in which the binding parts have to be inserted manually individually or in multiple copies. This entails an additional burden on the operator and limits throughput.

CA 2 321 937 A1 discloses a spiral binding device which also comprises a forming device which produces the spirals so that they are present individually from the outset and are automatically fed to the binding apparatus. However, the spiral binding device is thus complicated, expensive and heavy and requires a great deal of space. Changeover from one spiral diameter to another tends to be complicated. Moreover, the combination of the forming of the spiral with the binding is disadvantageous since it is associated with heating and subsequent cooling of the plastic wire, which, owing to the time required for cooling, sets disadvantageous boundary-conditions. The two devices have to be synchronized with one another so that they cannot both be operated at optimum speed in each case.

SUMMARY OF THE INVENTION

It is the object of the invention to provide a feed apparatus which isolates individual binding parts from a disordered quantity of binding parts and feeds them singly to a binding apparatus or another apparatus for further processing. Moreover, it is intended to provide a binding device which can be fed with disordered binding parts.

These objects are achieved by the features of claims 1 and 29, respectively.

The invention provides a feed apparatus for feeding binding parts to a binding apparatus or the like, which produces a sequence of individual binding parts from a disordered quantity and passes it to the binding apparatus. The isolated binding parts can then be introduced into the binding apparatus by a brief, substantially easier manual intervention or received by the same automatically, without manual intervention, and processed.

The binding device according to the invention operates substantially automatically. Binding parts need be replenished only from time to time, for example from a carton or other commercial packs. Their further processing then takes place without manual intervention.

BRIEF DESCRIPTION OF THE DRAWINGS

Below, the invention is explained in more detail with reference to figures which show only embodiments.

DESCRIPTION OF THE PREFERRED EMBODIMENTS

Figure 1:
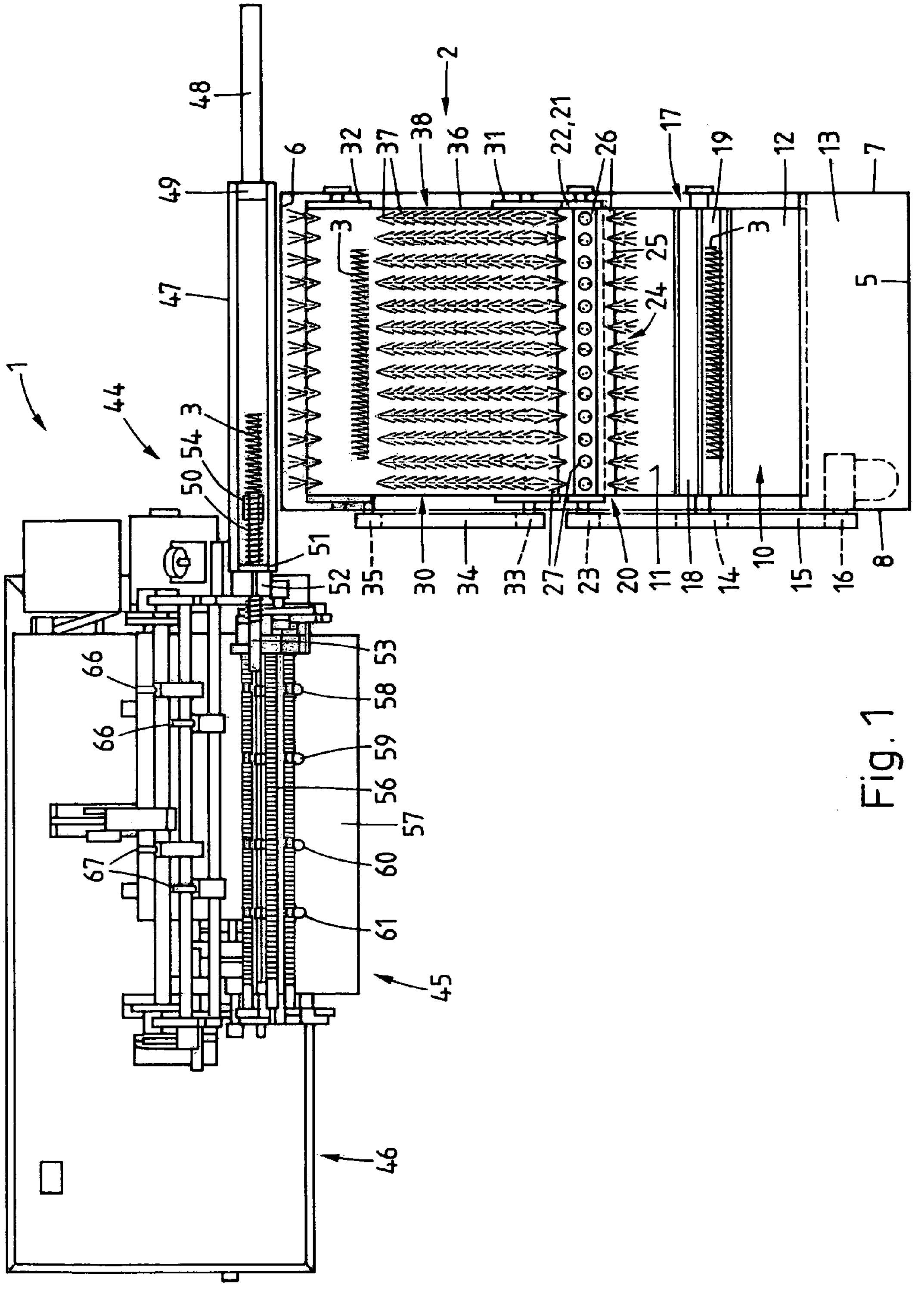
FIG. 1 shows a plan view of a binding device according to the invention, a cover of a feed apparatus being omitted.
Figure 2:
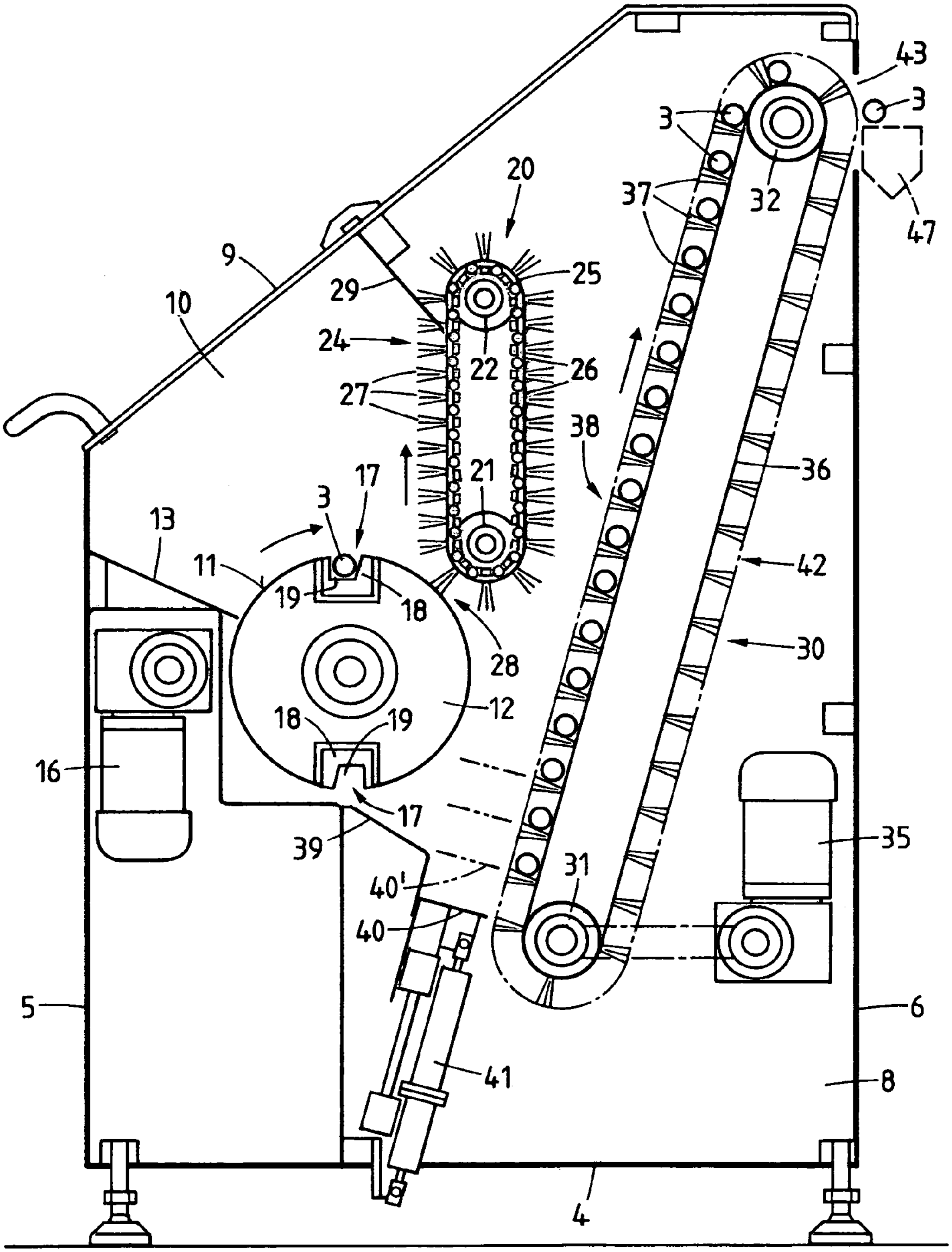
FIG. 2 shows a side view of the feed apparatus according to the invention, a side wall towards the front being omitted.
Figure 3:
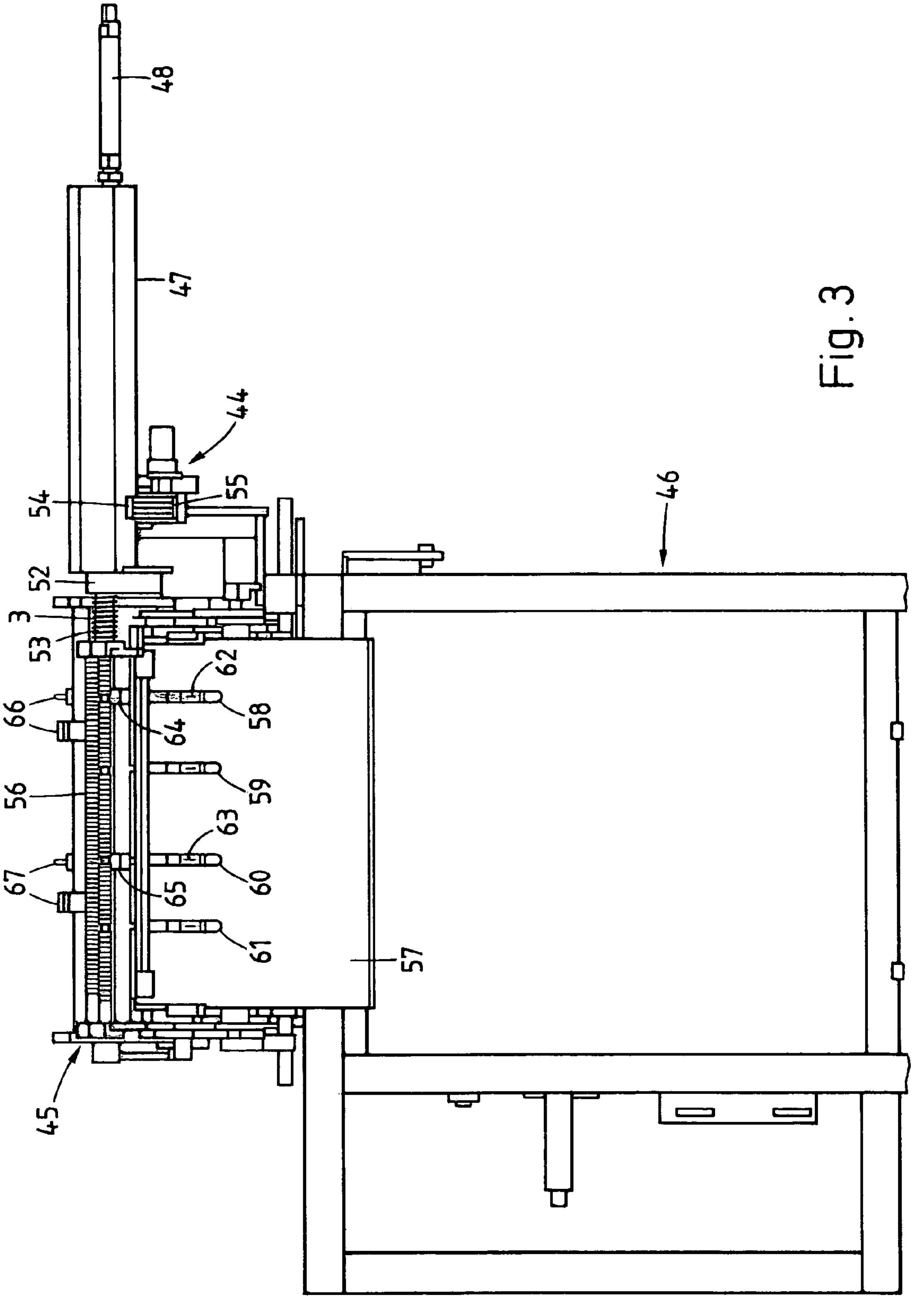
FIG. 3 shows a front view of the binding apparatus, FIG. 4 a side view of a further embodiment of a feed apparatus according to the invention, a side wall towards the front being omitted.

The binding device according to the invention as shown in FIGS. 1-3 comprises a binding apparatus 1 and a feed apparatus 2 which is arranged in front thereof and feeds the binding apparatus 1 in succession with individual binding parts, in the example spirals 3, which consist of resilient plastic, e.g. PVC, which are then used in each case for binding a bundle of sheets into a brochure. The binding apparatus 1 shown has substantially the same design as the above-mentioned R6-PVC from SWIGRAPH AG and also operates in the same way as the latter, but the use of other binding apparatuses is also possible. In particular, it is also possible to use a binding apparatus which processes not spirals but spines, likewise of resilient plastic, e.g. PVC.

The feed apparatus 2 comprises a housing having a rectangular contour, having a base 4, a front wall 5, a rear wall 6 and two side walls 7, 8. A sloping hinged cover 9 is mounted at the top. Below the hinged cover 9 is a storage space 10 for holding a disordered quantity of spirals 3 of a certain length and of a certain diameter. The bottom of the storage space 10 is occupied by a part of the circumferential surface 11 of a driveable isolating roll 12 and by an inclined base section 13 which is adjacent to the front wall 5 and projects towards the circumferential surface 11. The isolating roll 12 is fastened to a shaft which runs from the side wall 7 to the side wall 8 and is passed through the latter to a toothed wheel 14 which is arranged on the outside of the side wall 8 and is driven via a toothed belt 15 by a drive unit 16 which consists of an electric motor and a toothed wheel connected thereto by means of a mitre gear.

The circumferential surface 11 of the isolating roll 12 forms a continuous conveying surface which moves to the right in FIG. 2 and has two axial receptacles 17 which are diametrically opposite one another and extend over the entire length of the isolating roll 12. The receptacle 17 is formed in each case by a groove which is sunk into the circumferential surface 11 and in which an exchangeable insert 18 is anchored, which insert has an axial depression 19 of constant cross-section. That wall of the depression 19 which is at the front in the conveying direction is inclined outwards, while the rear wall is approximately perpendicular.

The depression 19 is dimensioned in such a way that its depth as well as its average width correspond approximately to the diameter of the processed spirals 3. By using inserts having in each case correspondingly dimensioned depressions, the feed apparatus 2 can be adapted to spirals of different diameters. The isolating roll 12 serves for isolating the spirals 3, as will be explained in more detail further below.

In the conveying direction, the storage space 10 is bounded by a scraper 20. It comprises two rollers 21, 22 which are arranged vertically one above the other and are mounted on shafts which extend parallel to those which carry the isolating roll 12, from the side wall 7 to the side wall 8. The lower shaft is passed through the side wall 8 and carries, on the outside thereof, a toothed wheel 23 over which the toothed belt 15 runs so that it too can be driven by the drive unit 16. An envelope member which, on the side facing the storage space 10, forms a scraping side 24 moveable in a scraping direction—vertically from bottom to top in the case described—runs over the rollers 21, 22. The envelope member is a chain 25 which is composed of strips 26 which are connected laterally in pairs and each of which carries a number of scraping fingers 27 on a support surface pointing outwards. The scraping fingers 27, which, on the scraping side 24, point towards the storage space 10, are each in the form of a bundle of resilient bristles.

Located in the region of the lower roller 21 is a scraping point 28 at which the scraping side 24 comes closest to the circumferential surface 11 of the isolating roll 12. There, the resilient scraping fingers 27 touch the circumferential surface 11 or in any case come so close to it that the distance from it is substantially smaller than the diameter of the thinnest spirals to be processed. The movements of the scraping fingers 27 and of the circumferential surface 11 at the scraping point 28 are in opposite directions. Arranged before the upper end of the scraping side 24 is a rake 29 which extends from the side wall 7 to the side wall 8 and has prongs which extend obliquely downwards close to the chain 25 and between which are spaces through which the scraping fingers 27 pass.

Arranged on the other side of the scraper 20, i.e. outside the storage space 10, is a conveyor 30 which comprises two rollers 31, 32 which are vertically a distance apart and are fastened to rotatable shafts which extend from the side wall 7 to the side wall 8 and are parallel to the shaft carrying the isolating roll 12. The lower shaft is once again passed through the side wall 8 and carries, on its outside, a toothed wheel 33 which can be driven via a toothed belt 34 by a further drive unit 35 consisting of an electric motor and a toothed wheel connected thereto by means of a mitre gear. The lower roller 31 is arranged lower than the isolating roll 12 and laterally just offset therefrom, while the upper roller 32 is located just below the upper edges of the side walls 7, 8 and is also horizontally somewhat further away from the isolating roll 12. A belt 36 which carries drivers 37 which project outwards at right angles and follow one another at fixed distances runs as an envelope member over the rollers 31, 32. Said drivers are in each case in the form of a row of bundles of resilient bristles which extends horizontally over the width of the belt 36. A conveying side 38 of the belt 36, which side faces the isolating roll 12, runs in a conveying direction which, on the basis of the described arrangement of the rollers 31, 32, slopes slightly from bottom to top.

A base strip 39 which slopes towards the conveyor 30 and bends downwards at the end through about 900 is located below the isolating roll 12. Arranged between said base strip and the conveyor 30 is a baffle plate 40 which is inclined towards said conveyor and, in a starting position, fills the space between the base strip 39 and the drivers 37 at the lower end of the conveyor 30. The baffle plate 40 can be pushed forward and drawn back to a limited extent by means of a pneumatic piston 41 parallel to the conveying side 30, said baffle plate always being partly below the isolating roll 12. An optical sensor (not shown) arranged on the baffle plate 40 serves for determining the presence of a spiral thereon. At the upper end of the conveying side 38, the upper roller 32 forms a deflection at which the conveying side 38 becomes a descending side 42. On the descending side, a slot 43 is provided in the rear wall 6, directly adjacent to the deflection.

The feed apparatus 2 has a control housed in the casing, for example a microprocessor, which processes the signals of the sensors and controls the movement of the electric motors and other actuators.

Below the slot 43, a feed unit 44 mounted on the binding apparatus 1 and intended for transporting the spiral further in the longitudinal direction to a binding unit 45 of the binding apparatus 1 is arranged on the outside of the rear wall 6. The feed unit 44 and the binding unit 45 are fastened to a frame 46. The feed unit 44 comprises a horizontal trough 47 arranged as a receiver directly below the slot 43 on the rear wall 6 of the feed apparatus 2 and, as a conveying unit, a pneumatic piston 48 which is mounted at one end thereof and carries a pusher 49 which can, in the trough 47, be advanced towards its opposite end and retracted. In order to save space, it is also possible to use, as the conveying unit, a rod-less pneumatic piston which is arranged below the trough and has a lug which projects through a longitudinal slot in the bottom thereof into the trough. Besides, a sloping baffle plate which projects beyond the edge of the trough 47 can be mounted below the slot 43, on the outside of the rear wall 6. An optical sensor (not shown) arranged in the trough 47 serves optionally for determining the presence of a spiral 3.

From the end opposite the pusher 49, a cylindrical first spindle 50 projects into the trough 47 and belongs to a substantially rotationally symmetrical one-piece guide part 51 of the binding apparatus 1, which guide part has, adjacent to the first spindle 50, a thicker cylindrical middle section which is clamped in a holder 52 and adjacent to which is a second spindle 53 whose diameter corresponds to that of the first spindle 50. The middle section has a continuous spiral groove whose bottom is adjacent at the same height to the lateral surfaces of the spindles 50, 53. The trough 47 is provided on the underside with a slot 54 through which a driveable friction wheel 55, which is plastic-coated for increasing the coefficient of friction and whose axis is parallel to that of the guide part 51 and which is mounted on a tiltable holder, can be pressed elastically against the first spindle 50 and can be retracted from it.

The second spindle 53 overlaps with a rotary arrangement 56 comprising three elongated driveable rolls which are parallel to it and whose axes, in cross-section in a starting position, form an equilateral triangle which has a horizontal base and at whose midpoint the axis of the guide part 51 is located. The rolls are mounted in tiltable holders so that they can be retracted from the starting position in which they are pressed elastically against the lateral surface of the second spindle 53. The three rolls each have about the same diameter, which is preferably smaller than the diameter of the second spindle 53. They are grooved and are partly plastic-coated for increasing the coefficient of friction.

A sloping support plate 57 for supporting a bundle of sheets is arranged below the rolls. Said support plate has four slots 58, 59, 60, 61 which run downwards from the upper edge and in which holders for hooks are arranged. A first hook 62 is arranged on the holder in the first slot 58, just behind the end of the second spindle 53, and a further hook 63 is arranged on one of the further holders, in the example in that in the third slot 60. The first hook is always arranged in the first slot 58, and the second hook in each case in one of the other slots 59-61. In which slot depends on the length of the sheets to be processed. The hooks 62, 63 follow in each case a lower half of a turn of the spirals 3 to be processed and in each case are hollowed out in a channel-like manner on the inside. The hooks 62, 63 project beyond the support surface of the support plate 57.

The holders with the hooks 62, 63 can be raised and lowered between the rolls of the rotary arrangement 56. Moreover, the hooks 62, 63 can be turned back behind the support plate 57. Optical sensors 64, 65 which in each case are suitable for determining the presence of a spiral are mounted approximately above the two hooks 62, 63. Above the rotary arrangement 56, two lowerable knives 66, 67 are likewise arranged approximately above the hooks 62, 63 and simultaneously slightly recessed. A conveyor belt parallel to the axis of the guide part 51 and intended for transporting away bound brochures can be arranged below the support plate 57.

The binding apparatus 1 has a control, for example a microprocessor, which processes the signals of the sensors and controls the movement of the electric motors and other actuators. It is housed in the frame 46.

For operation of the binding device, the hinged cover 9 is opened and the storage space 10 is filled with identical spirals 3. For example, the content of a carton containing a hundred spirals can simply be placed in the storage space 10. The length of the spirals should be slightly smaller than the width of the storage space 10 and therefore than the length of the isolating roll 12. By a choice of a suitable insert 18 for the grooves in the circumferential surface 11 of the isolating roll 12, the depressions 19 must be adjusted so that their depth and average width corresponds approximately to the diameter of the spirals 3.

The isolating roll 12 rotates in such a way that its circumferential surface 11 is moved towards the scraper 20 and under the latter towards the conveyor 30, while at the same time the chain 25 of the scraper 20 is moved so that the scraping side 24 moves in a direction opposite to the circumferential surface 11 at the scraping point 28 and then runs upwards through the rake 29.

Very probably, a spiral 3 now falls into the depression 19 in the circumferential surface 11, while the latter is moved over the bottom of the store 10. If it is an individual spiral not entangled with another one, it is transported directly under the scraper 20 and is at most scraped by the tips of the scraping fingers 27. However, it may also be entangled with at least one further spiral. The latter then projects beyond the circumferential surface 11. It is engaged by the scraping fingers 27 moving in the opposite direction, at the latest at the scraping point 28, and in most cases is separated by said scraping fingers from the first spiral. It is possible for it to be trapped in the scraping fingers 27 and carried along. In this case, however, it is scraped off at the rake 29 and falls back into the storage space 10.

As soon as the depression 19 reaches an ejection position in which it points towards the conveyor 30, the spiral rolls out of said depression and falls onto the baffle plate 40 which is present in the starting position and over which it rolls towards the conveyor 30, where it is picked up by the next driver 37 and is carried along further by the conveying side 38. The passage of the spiral over the baffle plate 40 is registered by the sensor. The rotation of the isolating roll 12 is tailored to the movement of the conveyor 30 so that, during a rotation of the isolating roll 12 through the distance between two successive depressions 19—in the example through 180°—said conveyor moves on precisely by the distance between two successive drivers 37, so that as a rule each driver 37 transports a spiral 3. When a depression 19 reaches the ejection position, one driver 37 in each case is present just below the baffle plate 40.

If the depression is empty, for example because a lower spiral placed entirely therein was entangled to such an extent with a second spiral projecting beyond the circumferential surface 11 that it was lifted out of the depression together therewith by the scraper 20, a certain time interval elapses without a spiral passing over the baffle plate 40 and being registered by the sensor. This is determined by the control, which then activates the pneumatic piston 41, which pushes the baffle plate 40 upwards next to the driver 37 which has remained empty. Shortly before the next driver 37 reaches the position next to the starting position of the baffle plate 40, the next depression of the isolating roll 12 reaches the ejection position and releases the next spiral. This then falls onto the baffle plate 40' (dashed line) pushed forward into a first correcting position, which is located above the starting position by the distance between two successive drivers 37, and rolls onto the conveyor 30, so that it is carried along by the driver 37 which has just moved past adjacent to the baffle plate 40' and had remained empty so far. A gap in the occupancy of the conveyor 30 is thus avoided. By advancing the baffle plate 40 to a second and third correcting position (dashed line), two further failures of the isolator can be compensated.

In the case of further failures, the work of the binding apparatus 1 can be discontinued, or it is possible to trigger an alarm which leads to manual intervention. Another possibility consists in allowing the isolator to operate slightly faster after the absence of a spiral, and returning the baffle plate 40 slowly again to the starting position. In this case, stoppage at the binding apparatus 1 has to be accepted only in the case of unusual accumulations of failures at the isolator.

Each spiral 3, supported by a driver 37, is now transported by the conveyor 30 to the upper roller 32, on the outside of which it rolls off the driver 37 and through the slot 43 in the rear wall 6 into the trough 47 of the feed unit 44, where its presence is determined by an optical sensor. On the hooks 62, 63 which project through the slots 58, 60 over the support surface of the support plate 57, a bundle of perforated sheets which are to be bound is suspended in such a way that the hooks 62, 63 project through two holes of the perforation which are located close to the opposite ends of the bundle. The bundle simultaneously rests on the support plate 57. The hooks 62, 63 are then raised between the rolls of the rotary arrangement, and the spiral 3 is advanced by the pusher 49 until its front end abuts the middle section of the guide part 51 and it is slightly elastically compressed. The friction wheel 55 is now tilted towards the first spindle 50 until it presses against the spiral 3 and then activates its drive. The spiral 3 is thus caused to rotate and threads into the spiral groove in the middle section of the guide part 51, so that, on further rotation, its front end is advanced through the middle section and onto the second spindle 53. The pusher 49 is retracted to the starting position. As soon as the spiral 3 projects slightly beyond the second spindle 53, this is detected by the sensor 64 and the friction wheel 55 is stopped and retracted.

The three rolls are then moved towards the second spindle 53 so that they press elastically against the outside of the spiral 3. They are then caused to rotate, with the result that the spiral 3 is likewise rotated and at the same time advanced, the feed in the case of one revolution corresponding to the pitch of the spiral 3. The distance between successive holes in the perforation of the bundle of sheets likewise corresponds to this pitch, so that the front end of the spiral is guided through a hole in the perforation of the bundle during each revolution. The two hooks 62, 63 through the grooves of which the spiral 3 is pushed thus offer additional guidance. As soon as the spiral reaches the sensor 65, the latter responds and the rolls are stopped and are retracted from the spiral. The knives 66, 67 are then lowered and in each case a short section is cut off at the two ends of the spiral outside the hooks 62, 63 and an end piece of the remaining part is bent towards the axis of the spiral and the binding is thus fixed. The hooks 62, 63 are then lowered into the position which they assume in the starting position and, during the last part of the lowering movement, are simultaneously rotated behind the support plate 57 so that the bound brochure is free and slides over the support plate 57 onto the conveyor belt.

Many modifications of the binding device described are possible without departing from the scope of the invention. Instead of two depressions, the isolating roll may also have more depressions, for example four depressions or only one depression. Instead of an isolating roll, it is also possible to use an envelope member which runs, for example, over two rollers and is composed, for example in a chain-like manner, of links with a depression and links without a depression. Conversely, the scraper may be in the form of a roll. It need not necessarily be brush-like but may also carry, for example, resilient scraping fingers or scraping webs of plastic, but the brush-like design described has proved very satisfactory. The length and direction of the conveyor depend in particular on where the spirals have to be released so that they can be picked up by the binding apparatus. The drivers may also be in the form of, for example, webs or hollows. In certain circumstances, the conveyor may also be completely dispensed with.

The binding apparatus, too, can be formed otherwise. In particular, it can process spines instead of spirals, which requires a different procedure and a different design. On the other hand, the feed apparatus can also be used without modification for isolating and feeding of spines.

Figure 4:
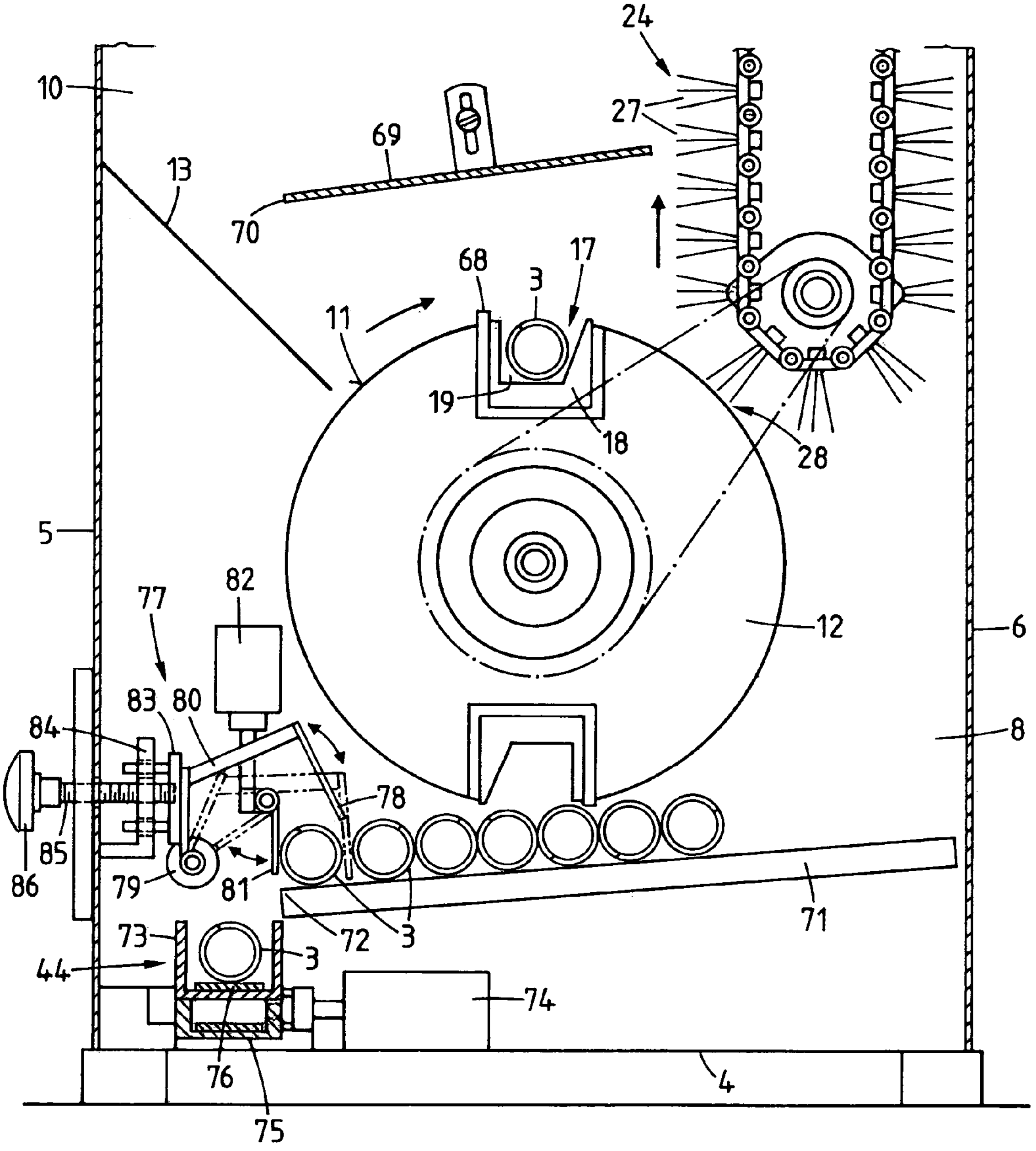

The feed apparatus according to the invention as shown in FIG. 4 is in the form of a table-top device and suitable in particular for feeding binding parts, in particular spirals, to an only partly automatic binding apparatus which is arranged adjacent to the feed apparatus. The feed apparatus isolates the binding parts and makes them available in this form at a delivery. In the binding apparatus—a spiral threading machine—a spiral is then threaded manually into the perforation of a bundle of sheets, whereupon the binding apparatus automatically performs the further introduction thereof by rotation. Finally, the spiral is manually cut and bent. Corresponding binding apparatuses are known in various embodiments, with and without a spindle and with an electrically or manually driveable roll or a driveable friction wheel or two driven rolls for rotation of the spiral, e.g. SWIGRAPH TC-350, GBC CC2700 ColorCoil™, BOMCO SP1, SE2, SP2E, etc.

The design of the feed apparatus is similar to that of the feed apparatus already described. Corresponding parts are denoted by the same reference numerals and, apart from differing details, are not described again. The isolating roll 12 is somewhat differently formed in that, for supporting the reception of spirals 3 into the depression 19 from the storage space 10 located above the isolating roll 12, a driver projection, namely a continuous driver strip 68 projecting by about 0.5 cm, is provided in each case on the rear edge of the receptacle 17, considered in the direction of rotation. Arranged above the isolating roll 12 in the storage space 10 is, in addition, a separating plate 69 which extends from a rear edge, which is separated from the scraping side 24 by less than one unit which corresponds to the diameter of the spiral or the depth of one of the depressions 19, up to a front edge 70, sloping slightly downwards towards the front wall 5. There, it leaves a passage whose width is approximately between said unit and twice said unit, for example corresponds approximately to one and a half times said diameter. The front edge 70 is approximately the same distance above the isolating roll 12. The separating plate 69 is adjustable in height and is suspended so as to be rotatable about a horizontal axis, so that its position can be adapted to the spirals 3, in particular to the diameter thereof.

Arranged below the isolating roll 12 is a collecting ramp 71, which slopes slightly downwards from the rear wall 6 to an end edge 72. Arranged directly adjacent to the end edge 72 is a feed unit 44 having a lower-lying trough 73 parallel to the end edge 72 and of U-shaped cross-section, as a receptacle, and, as a conveying unit, a belt conveyor 75 which is driven by a drive unit 74 and whose upper conveying side 76 runs over the bottom of the trough 73. The trough 73 and the belt conveyor 75 are led through an orifice in the front part of the side wall, omitted in the figure, outside to a delivery point at the end of the trough 73, where a braking apparatus comprising resilient bristles projecting beyond the conveying side is provided. An optical sensor (not shown) determines whether a spiral 3 is present in the trough 73 or whether the latter is vacant.

Provided at the end of the collecting ramp 71 is a separating apparatus 77 which serves for separating the lowermost of the spirals 3 on the collecting ramp 71 from the others and for ensuring that the spirals reach the feed unit 44 without overlap. For this purpose, it has a first barrier, a first flap 78 which is approximately a spiral diameter away from the end edge 72 and, suspended from a rotary lever 80 operable by means of a rotary magnet 79, can be raised and lowered and a second barrier which is in the form of a second flap 81 which is pivotably suspended directly above the end edge 72 and can be operated by means of a pull-type magnet 82. The two barriers can thus block or release the collecting ramp 71.

To enable the distance between the barriers to be adapted to the diameter of the spirals, the rotary lever 80 and the rotary magnet 79 are fastened to a plate-like holder 83 whose distance from a plate 84 anchored on the front wall 5 is adjustable. For this purpose, the holder 83 is displaceably mounted on the plate 84, and a screw bolt 85 whose tip rotatably but nondisplaceably engages the holder 83 is led through the front wall 5 and the plate 84. At the end located outside the front wall 5, the screw bolt 85 is provided with a knob 86. By turning said knob, the position of the first barrier in the longitudinal direction of the collecting ramp 71, and hence the distance of said ramp from the second barrier, can be adjusted. An optical sensor (not shown) serves for determining whether or not a spiral is present between the first barrier and the second barrier.

During operation, the spirals 3 or other binding parts are isolated substantially in the manner described in connection with the feed apparatus according to the first embodiment. The separating plate 69 prevents larger bundles of entangled spirals 3 from reaching the isolating roll 12. An isolated spiral 3 falls onto the collecting ramp 71, where it rolls towards the end edge 72 until it meets another spiral 3 or the first flap 78. If the space between the first flap 78 and the second flap 81 is empty, the first flap 78 is raised by the rotary magnet 79 so that the lowermost spiral rolls further towards the end edge 72 until it meets the second flap 81. The first flap 78 is then lowered again and prevents any further spirals 3 from rolling subsequently.

A spiral 3 is now present between the first flap 78 and the second flap 81. As soon as the feed unit 44 is free, the second flap 81 is swivelled by the pull-type magnet 82 towards the front wall 5 so that it releases the spiral 3, which then falls into the trough 73 and onto the conveying side 76. It is then, by the conveyor 75, transported in part through the front part of the side wall, outside to the delivery point, where its front end is stopped by the braking apparatus and can be picked up by an operator. After manual threading into the perforation of the bundle of sheets, it is then drawn in by the downstream binding apparatus and removed from the trough 73.

LIST OF REFERENCE NUMERALS

1 Binding apparatus
2 Feed apparatus
3 Spirals
4 Base
5 Front wall
6 Rear wall
7, 8 Side walls
9 Hinged cover
10 Storage space
11 Circumferential surface
12 Isolating roll
13 Base section
14 Toothed wheel
15 Toothed belt
16 Drive unit
17 Receptacle
18 Insert
19 Depression
20 Scraper
21, 22 Rollers
23 Toothed wheel
24 Scraping side
25 Chain
26 strip
27 scraping projection
28 scraping point
29 rake
30 conveyor
31, 32 rollers
33 toothed wheel
34 toothed belt
35 drive unit
36 belt
37 driver
38 conveying side
39 base strip
40 baffle plate
41 pneumatic piston
42 descending side
43 slot
44 feed unit
45 binding unit
46 frame
47 trough
48 pneumatic piston
49 pusher
50 first spindle
51 guide part
52 holder
53 second spindle
54 slot
55 friction wheel
56 rotary arrangement
57 support plate
58-61 slots
62, 63 hooks
64, 65 sensors
66, 67 knives
68 driver strip
69 separating plate
70 front edge
71 collecting ramp
72 end edge
73 trough
74 drive unit
75 belt conveyor
76 conveying side
78 first flap
79 rotary magnet
80 rotary lever
81 second flap
82 pull-type magnet
83 holder
84 plate
85 screw bolt
86 knob We is claimed is:

1. Feed apparatus for feeding binding parts, such as spirals or spines, to an apparatus for further processing, in particular a binding apparatus, comprising a storage space for binding parts, comprising an isolator which has a continuous conveying surface which is movable in a conveying direction from the bottom of the storage space outwards, has successive receptacles for binding parts, which form depressions oriented transversely to the conveying direction, and comprising a scraper which is arranged at the limit of the storage space and under which the conveying surface can be moved and which comprises resilient scraping projections which are distributed over the width thereof, project towards said conveying surface and touch or almost touch said conveying surface at a scraping point.

2. Feed apparatus according to claim 1, characterized in that the isolator is in the form of a driveable isolating roll which is rotatable about a horizontal axis and whose circumferential surface forms the conveying surface.

3. Feed apparatus according to claim 1, characterized in that those walls of the depressions which are at the front in the conveying direction each slope outwards.

4. Feed apparatus according to claim 1, characterized in that in each case at least one drive projection projecting beyond the conveying surface and preferably in the form of a driver strip parallel to the depression is provided at the rear edges of the depressions, considered in the conveying direction.

5. Feed apparatus according to claim 1, characterized in that the receptacles have grooves into which inserts for the production of depressions of a certain cross-section can be inserted.

6. Feed apparatus according to claim 1, for feeding binding parts of a certain diameter, characterized in that the depth and the width of each depression correspond in each case approximately to said diameter.

7. Feed apparatus according to claim 1, characterized in that the scraping fingers are in the form of a bundle of resilient bristles.

8. Feed apparatus according to claim 1, characterized in that the scraper comprises a continuous support surface which is movable in a scraping direction which, at the scraping point, is opposite to the conveying direction of the conveying surface.

9. Feed apparatus according to claim 8, characterized in that the support surface is formed by a closed envelope member which runs over two perpendicularly spaced rollers, a scraping side facing the storage space running approximately upwards from the scraping point.

10. Feed apparatus according to claim 9, characterized in that a rake oriented transversely to the scraping direction and having prongs which point towards the scraping side and between which the scraping fingers run is arranged above the scraping point.

11. Feed apparatus according to claim 1, characterized in that a separating plated sloping downwards in a direction opposite to the conveying direction to a front edge is arranged in the storage space, the front edge being separated from the bottom of the storage space at least by the depth of one of the depressions.

12. Feed apparatus according to claim 11, characterized in that the distance from the front edge to the bottom of the storage space is between the depth of the depressions and twice said depth.

13. Feed apparatus according to claim 11, characterized in that a rear edge which bounds the separating plated is separated by a distance of less than the depth of one of the depressions from the scraper.

14. Feed apparatus according to claim 11, characterized in that the distance from the front edge of the separating plate to the bottom of the storage space is adjustable.

15. Feed apparatus according to claim 1, characterized in that it has a conveyor, outside the storage space and directly downstream of the isolator, for further transport of the individual binding parts, which comprises an envelope member having a conveying side which faces the isolator and runs away from the isolator in a conveying direction and carries drivers pointing towards said isolator, for carrying along in each case a binding part oriented transversely to the conveying direction.

16. Feed apparatus according to claim 15, characterized in that the conveying direction is obliquely upwards.

17. Feed apparatus according to claim 15, characterized in that the drivers are in each case in the form of a row of bundles of resilient bristles which extends transversely to the conveying direction.

18. Feed apparatus according to claim 15, characterized in that it comprises a baffle plate arranged below the isolator and sloping towards the conveying side.

19. Feed apparatus according to claim 18, characterized in that the baffle plate can be advanced and retracted parallel to the conveying direction.

20. Feed apparatus according to claim 15, characterized in that the conveyor has a deflection at which the conveying side, at its upper end, becomes a descending side, where binding parts conveyed by the conveyor are ejected therefrom.

21. Feed apparatus according to claim 1, characterized in that it comprises a feed unit, outside the storage space and downstream of the isolator, for further transporting the individual binding parts in the longitudinal direction to a delivery point.

22. Feed apparatus according to claim 21, characterized in that the feed unit comprises a conveying unit which leads to the delivery point and is preferably in the form of a belt conveyor.

23. Feed apparatus according to claim 22, characterized in that a braking apparatus is arranged at the delivery point.

24. Feed apparatus according to claim 21, characterized in that it has a collecting ramp arranged directly below the isolator and inclined in a longitudinal direction towards an end edge, which the feed unit abuts, which collecting ramp is intended for receiving the individual binding parts arriving from the isolator.

25. Feed apparatus according to claim 21, characterized in that a separating apparatus for separating a binding part from any further binding parts is arranged before the feed unit.

26. Feed apparatus according to either of claim 24, characterized in that the separating apparatus comprises two barriers which follow one another at a distance in the longitudinal direction and in each case can block or release the collecting ramp.

27. Feed apparatus according to claim 26, characterized in that the barriers are each in the form of a raisable and lowerable or tiltable flap.

28. Feed apparatus according to claim 26, characterized in that the distance between the barriers is adjustable in the longitudinal direction.

29. Binding device comprising a feed apparatus according to claim 1 and a binding apparatus downstream thereof, to which the binding parts can be fed individually from the feed apparatus.

30. Binding device according to claim 29, characterized in that it comprises a feed unit arranged downstream of the isolator, outside the storage space, and having a receptacle for a binding part and a conveying unit for further transporting individual binding parts in the longitudinal direction to a binding unit.

* * * * *